(12) United States Patent
Lee (10) Patent No.: US 8,531,151 B2
(45) Date of Patent: Sep. 10, 2013

(54) PORTABLE TERMINAL AND DISPLAY CONTROLLING METHOD THEREOF

(75) Inventor: Kwang-Joon Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 12/579,367

(22) Filed: Oct. 14, 2009

(65) Prior Publication Data

US 2010/0237785 A1 Sep. 23, 2010

(30) Foreign Application Priority Data

Mar. 19, 2009 (KR) ........................ 10-2009-0023697

(51) Int. Cl.
*H02J 7/00* (2006.01)
*H02J 7/04* (2006.01)
*H02J 7/16* (2006.01)
*H04B 1/38* (2006.01)

(52) U.S. Cl.
USPC ........... 320/101; 320/134; 320/135; 320/136; 320/114; 455/572; 455/573

(58) Field of Classification Search
USPC ................. 320/101, 114, 115, 116, 118, 134, 320/135, 136; 455/572, 573
See application file for complete search history.

(56) References Cited

U.S. PATENT DOCUMENTS

| 6,051,954 | A  | * | 4/2000 | Nagao et al. | 320/101 |
| 6,346,791 | B1 | * | 2/2002 | Barguirdjian | 320/101 |
| 8,040,102 | B2 | * | 10/2011 | Kao et al. | 320/101 |
| 2004/0130556 | A1 | | 7/2004 | Nokiyama | |
| 2007/0069684 | A1 | * | 3/2007 | Ramsden | 320/101 |
| 2007/0069685 | A1 | * | 3/2007 | Sato | 320/101 |
| 2008/0238354 | A1 | * | 10/2008 | Chang | 320/101 |
| 2009/0039797 | A1 | * | 2/2009 | Wang et al. | 315/246 |
| 2009/0140663 | A1 | * | 6/2009 | Jiang | 315/291 |
| 2011/0006724 | A1 | * | 1/2011 | Reckelhoff | 320/101 |

FOREIGN PATENT DOCUMENTS

WO 2006/060144 6/2006

* cited by examiner

*Primary Examiner* — Edward Tso
*Assistant Examiner* — Alexis Boateng
(74) *Attorney, Agent, or Firm* — Lee, Hong, Degerman, Kang & Waimey (57) ABSTRACT

A portable terminal and a method for controlling a display of a mobile terminal are provided. The portable terminal includes a terminal body having a display, a solar cell disposed on at least one region of the terminal body and configured to convert sunlight into electric energy for charging a battery, a sensing unit configured to detect a quantity of electric energy generated from the solar cell, and a controller configured to control brightness of the display based upon the quantity of energy detected by the sensing unit.

8 Claims, 8 Drawing Sheets

PORTABLE TERMINAL AND DISPLAY CONTROLLING METHOD THEREOF

CROSS-REFERENCE TO a RELATED APPLICATION

Pursuant to 35 U.S.C. §119(a), this application claims the benefit of earlier filing date and right of priority to Korean Application No. 10-2009-0023697, filed on Mar. 19, 2009, the contents of which is incorporated by reference herein in its entirety.

BACKGROUND OF THE INVENTION

1. Field of the Invention

The present invention relates to a portable terminal having a solar cell and a display controlling method thereof.

2. Background of the Invention

Portable terminals can be easily carried and have one or more of functions such as supporting voice calls and telephony calls, inputting and/or outputting information, storing data and the like.

As it becomes multifunctional, the portable terminal can be allowed to capture still images or moving images, play music or video files, play games, receive broadcast and the like, so as to be implemented as an integrated multimedia player.

Various attempts have been done for the multimedia devices by hardware or software in order to implement such complicated functions. For example, a user interface environment is provided in order for users to easily and conveniently retrieve or select functions.

Also, many users have their portable terminals to express their own personalities, and accordingly, various designs are required for the portable terminal.

In recent time, as users are getting concerned about electric devices employing an eco-friendly technology, solar cells are more widely used in portable terminals. Such solar cell can be configured to charge a portable terminal using sunlight.

SUMMARY OF THE INVENTION

Therefore, an object of the present invention is to a configuration and method for controlling brightness of a display using a solar cell mounted in a portable terminal.

To achieve these and other advantages and in accordance with the purpose of the present invention, as embodied and broadly described herein, there is provided a portable terminal including, a terminal body having a display, a solar cell disposed on at least one region of the terminal body and configured to convert sunlight into electric energy for charging a battery, a sensing unit configured to detect a quantity of state relating to the electric energy generated from the solar cell, and a controller configured to control brightness of the display based upon the quantity of state detected by the sensing unit.

The sensing unit may be aligned on a line which connects the solar battery to the battery, and implemented as a current monitor for detecting a current capacity generated from the solar cell.

The controller may control the display to have brightness proportional to the current capacity such that the brightness of the display is in proportion to a peripheral illumination.

The portable terminal may further include a switching unit disposed between the current monitor and the battery and configured to dissipate a current generated from the solar cell to a ground when the battery is completely charged.

The controller may control the display to maintain brightness higher than a reference level even when a peripheral illumination of the terminal body is lower than a predetermined level.

A battery cover for covering the battery may be detachably coupled to the terminal body, and the solar cell may be attached onto the battery cover.

In another aspect of the present invention, there is provided a method for controlling a display of a portable terminal including, converting sunlight into electric energy to charge a battery, detecting a quantity of state relating to the electric energy charged in the battery, and controlling brightness of a display based upon the detected quantity of state.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of preferred configurations of portable terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Figure 1:
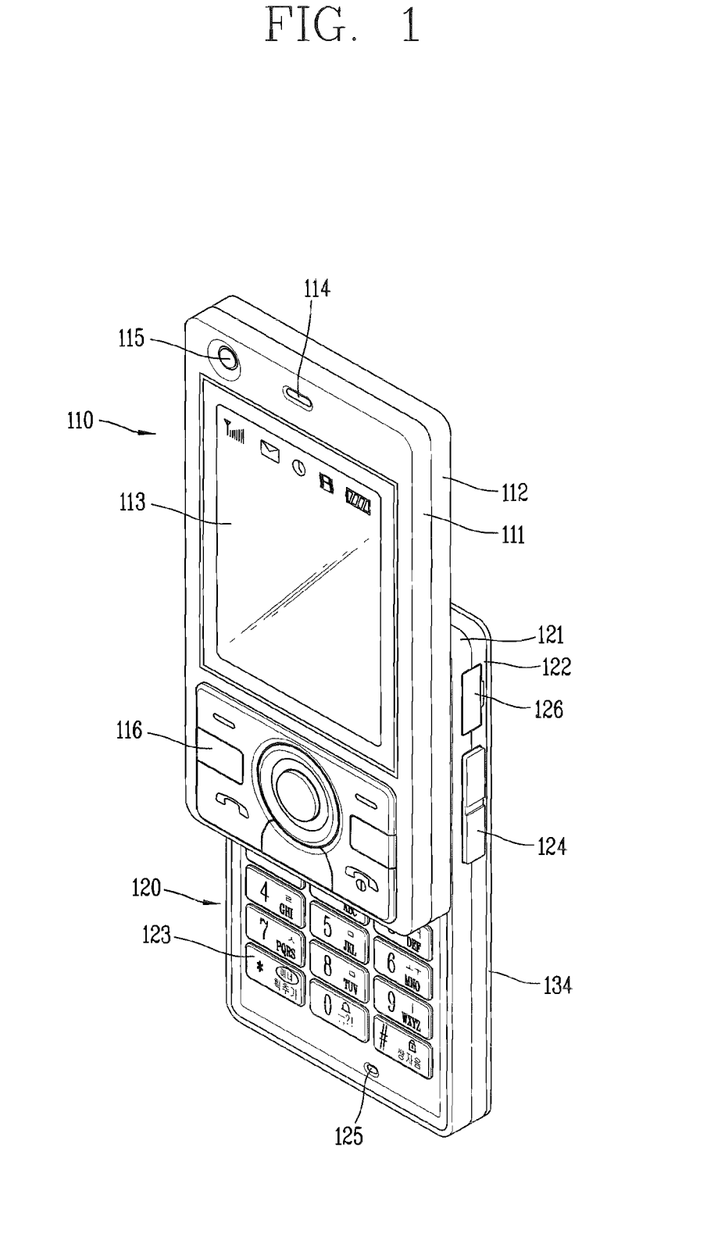
FIG. 1 is a front perspective view of a portable terminal in accordance with one embodiment of the present invention.

FIG. 1 is a front perspective view of a portable terminal in accordance with one embodiment of the present invention.

The portable terminal according to the present invention may include a first body 110, and a second body 120 slidable from the first body 110 in at least one direction. This embodiment exemplarily illustrates a slide type portable terminal;

however, the present invention may be applicable to various types of portable terminals, such as bar type, folder type, swing type and the like.

The first body 110 is positioned over the second body 120, which is referred to as a closed position (closed state or closed configuration). As shown in FIG. 1, the first body 100 exposes at least part of the second body 120, which is referred to as an open position (open state or open configuration).

The portable terminal may typically operate in a standby mode in the closed configuration but such standby mode may be released according to a user's manipulation. Also, the portable terminal may typically operate in a call-communication mode in the open configuration but such mode may be converted into the standby mode according to the user's manipulation or after a certain time duration.

A case (casing, housing, cover, etc.) forming an outer appearance of the first body 110 may be formed from a front case 111 and a rear case 112. A space formed by the front case 111 and the rear case 112 may accommodate various components therein.

At least one intermediate case may further be disposed between the front case 111 and the rear case 112.

Such cases may be formed by injection-molded synthetic resin, or may be formed using a metallic material such as stainless steel (STS) or titanium (Ti).

The first body 110, in detail, the front case 111 is shown, having a display 113, an audio output unit 114, a first image input unit 115, a first manipulating portion 116 and the like.

The display 113 may be configured to visually represent information. The display 113 may further include a touch screen to allow the input of information by a user's touch.

The first audio output unit 114 may be implemented as a receiver or a speaker. The first image input unit 115 may be implemented as a camera module for capturing images or video for a user or the like.

The first manipulation unit 116 may receive a command input for controlling the operation of the portable terminal in accordance with the one embodiment of the present invention.

Similar to the first body 110, the case of the second body 120 may be formed from a front case 121 and a rear case 122. A second manipulation unit 123 may be disposed at the second body 120, particularly, at a front face of the front case 121.

At least one of the front case 121 or the rear case 122 may be provided with a third manipulation unit 124, an audio input unit 125 and an interface 126.

The first to third manipulation units 116, 123 and 124 may be referred to as a manipulating portion. Such manipulating portion can employ any tactile manner that a user can touch or tap for manipulation.

For instance, the manipulation portion may be implemented as a dome switch, a touch screen, a touchpad or the like by which a user can input commands or information in a pushing or touching manner. Alternatively, the manipulating portion may be implemented as a wheel or a jog which rotates keys or a joystick.

From the functional perspective, the first manipulation unit 116 is configured to input commands such as START, END, SCROLL or the like, and the second manipulation unit 123 is configured to input numbers, letters (characters), symbols or the like. Also, the third manipulation unit 124 can be worked as a hot key which performs a specific function, such as activating a first image input unit 115.

The sound input unit 125 may be implemented, for example, as a microphone to receive user's voice or other sound.

The interface 126 may interface the portable terminal according to the present invention and external devices so as to allow data exchange therebetween or the like. For example, the interface 124 may be at least one of a wired/wireless access terminal for earphones, a short-range communication port (e.g., IrDA port, BLUETOOTH port, wireless Lan port, and the like), and power supply terminals for supplying power to the portable terminal.

The interface 126 may be a card socket for accommodating an external card such as Subscriber Identification Module (SIM), User Identity Module (UIM), memory card for storing information, or the like.

Figure 2:
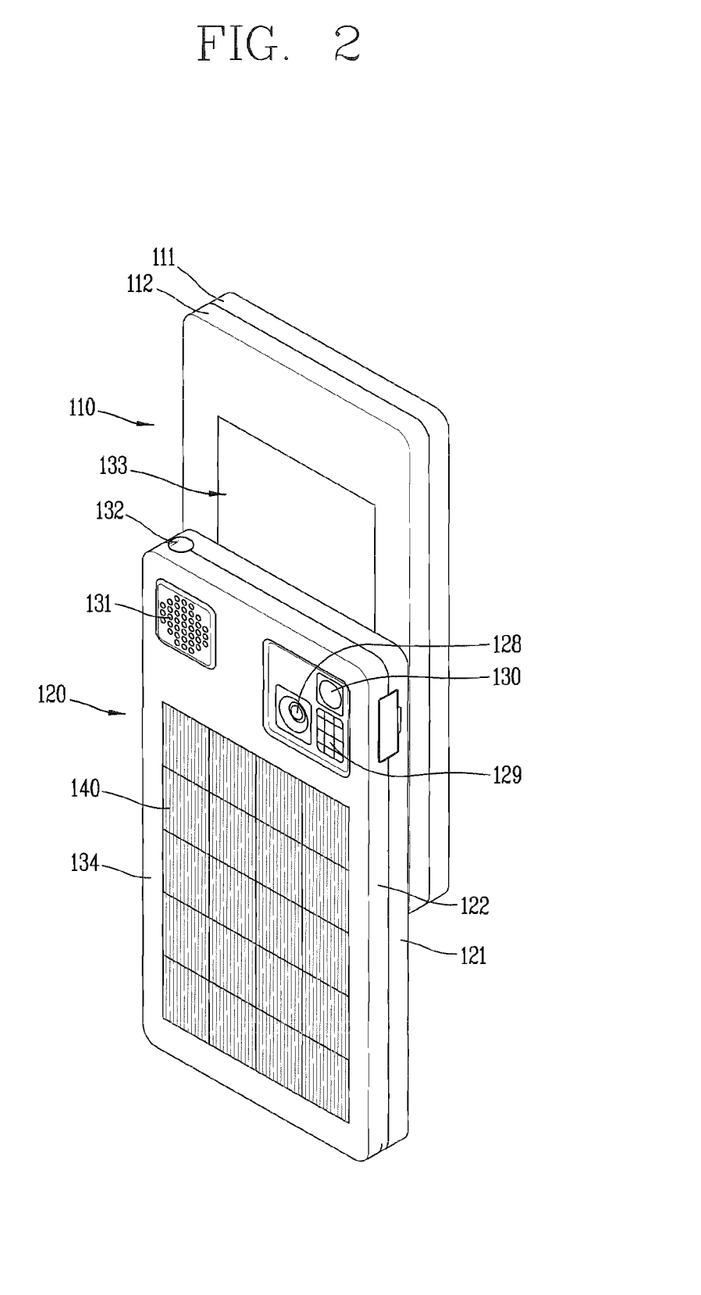
FIG. 2 is rear perspective view of the portable terminal in accordance with the one embodiment of the present invention.

FIG. 2 is a rear perspective view of the portable terminal of FIG. 1.

As shown in FIG. 2, a second image input unit 128 may further be disposed at the rear surface of the rear case 122 of the second body 120. The second image input unit 128 faces a direction which is substantially opposite to a direction faced by the first image input unit 115 (see FIG. 1). Also, the second image input unit 128 may be a camera having different pixels from those of the first image input unit 115.

For example, the first image input unit 115 may operate with relatively lower pixels (lower resolution). Thus, the first image input unit 115 may be useful when a user can capture his face and send it to another party during a video call or the like. On the other hand, the second image input unit 128 may operate with relatively higher pixels (higher resolution) such that it can be useful for a user to obtain higher quality pictures for later use.

A flash 129 and a mirror 130 may be disposed adjacent to the second image input unit 125. The flash 129 operates in conjunction with the second image input unit 128 when taking a picture using the second image input unit 128. The mirror 130 can cooperate with the second image input unit 128 to allow a user to photograph himself in a self-portrait mode.

A second audio output unit 131 may further be disposed at the rear case 122.

The second audio output unit 131 can cooperate with the first audio output unit 114 (see FIG. 1) to provide stereo output. Also, the second audio output unit 131 may be configured to operate as a speakerphone.

At one side of the rear case 122 may be disposed a broadcast signal receiving antenna 132, as well as an antenna for call communications or the like. The antenna 132 may retract into the second body 120.

A part of a slide module 133 for slidably coupling the first body 110 to the second body 120 may be disposed at the rear case 112 of the first body 110.

Another part of the slide module 133 may be disposed at the front case 121 of the second body 120, so as not to be exposed to the exterior as shown in FIG. 2.

As described above, it has been described that the second image input unit 128 is disposed at the second body 120; however, the present invention may not be limited to the configuration. It is also possible that one or more of those components (e.g., 128 to 132), which have been described to be implemented on the rear case 122, such as the second image input unit 128, will be implemented on the first body 110, particularly, on the rear case 112. In this configuration, the component(s) disposed on the rear case 112 can be protected by the second body 120 in a closed state of the portable terminal. In addition, without the second image input unit 128, the first image input unit 115 can be implemented to be rotatable so as to rotate up to a direction which the second image input unit 128 faces.

The power supply 127 (see FIG. 3) for supplying power to the portable terminal may be disposed at the rear case 122. The power supply 127 as a rechargeable battery may be detachably coupled for charging. This embodiment illustrated that the battery 127 is detachably coupled to the terminal body, but the battery 127 may be mounted inside the terminal body.

A battery cover 134 for covering the batter 127 may be detachably coupled to the rear case 122. The battery cover 134 may be provided with a solar cell 140 for converting sunlight into electricity may be disposed on the battery cover 134.

The solar cell 140 denotes a semiconductor device for converting solar radiation energy into electric energy by using a photovoltaic effect. Here, the photovoltaic effect refers to a phenomenon that when light is incident a P-N junction of a semiconductor or on a boundary surface between a metal with a rectifying function and a semiconductor, electrons and holes created in the semiconductor are separated due to a contact phase difference, resulting in induction of different types of electricity from both materials.

The solar cell 140 may be categorized into a silicon solar cell and a compound semiconductor solar cell. The silicon solar cells may be classified into a single crystalline silicon solar cell, a polycrystalline silicon solar cell, an amorphorous silicon solar cell and the like. The compound semiconductor solar cells may be classified into a solar cell using compounds, such as CdTe, CIGS and the like, a dye-sensitized solar cell, an organic solar cell and the like.

In this embodiment, the solar cell 140 may be attached onto an outer surface of the battery cover 134. Further, the solar cell 140 may be implemented in a type of module that a plurality of cells are integrated in a matrix.

In this embodiment, in order to increase an area of the solar cell 150 as great as possible, the solar cell 140 is disposed on the rear surface of the second body 120. However, the solar cell 140 may be disposed at any other portions of one of the first and second bodies 110 and 120.

Figure 3:
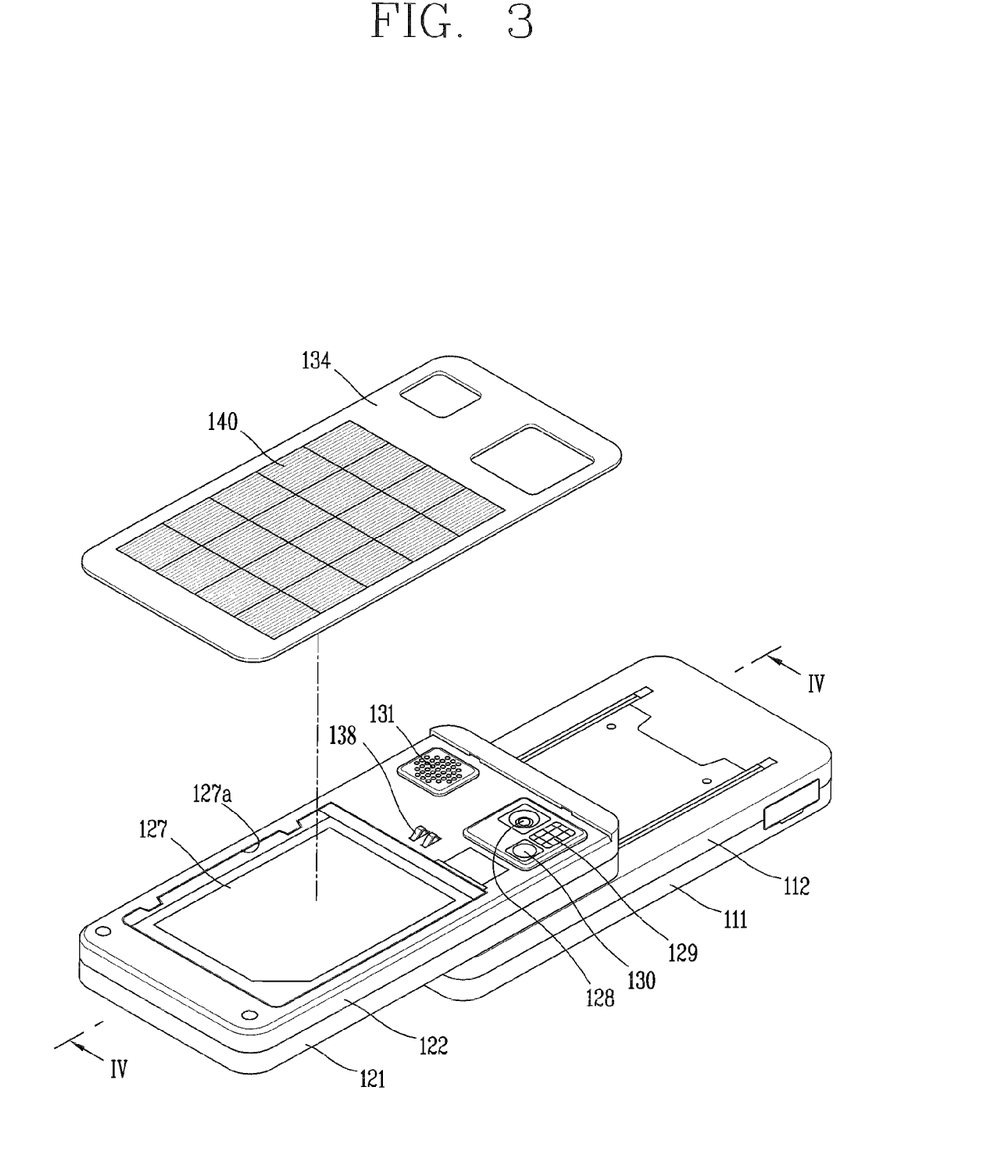
FIG. 3 is a perspective view of the portable terminal in a state of a battery cover being detached.
Figure 4:
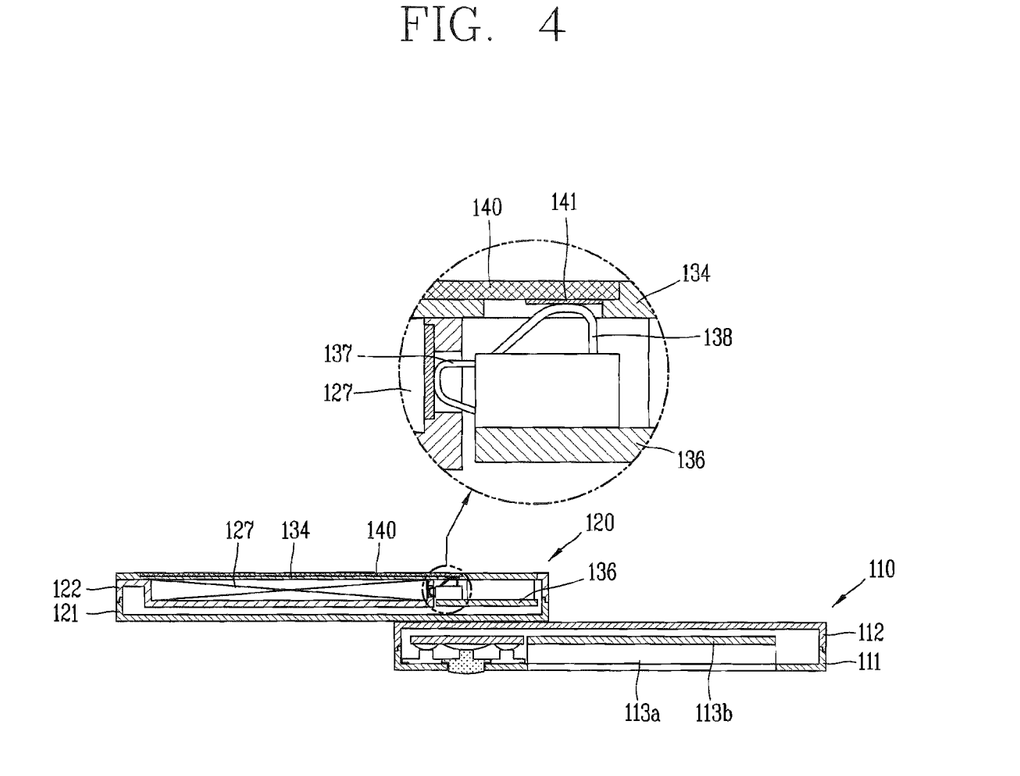
FIG. 4 is a cross-sectional view of the portable terminal taken along the line IV-IV of FIG. 3.

FIG. 3 is a perspective view of the portable terminal in a state of a battery cover being detached, and FIG. 4 is a cross-sectional view of the portable terminal taken along the line IV-IV of FIG. 3.

At least one printed circuit board 136 may be interposed between the front case 121 and the rear case 122 of the second body 120.

A battery mounting portion 127a in which the battery 127 is mounted may be formed in the rear case 122. Upon being mounted in the battery mounting portion 127a, the battery 127 is electrically connected to the printed circuit board 136 by a connection terminal 137. The battery 127 having electrically connected to the printed circuit board 136 thus supplies power required for operation of the portable terminal.

A first connection terminal 141 electrically connected to the solar cell 140 may be disposed at a rear surface of the battery cover 134, and a second connection terminal 138 is disposed at a position of the second body 120, corresponding to the first connection terminal 141. The second connection terminal 138 is mounted in the printed circuit board 136 with partially being exposed to the outside of the rear case 122.

Upon the battery cover 134 being coupled to the second body 120, the first and second connection terminals 141 and 138 come in contact with each other, such that the solar cell 140 can be electrically connected to the printed circuit board 136. The solar cell 140 may convert solar energy of sunlight into electric energy, and the battery 127 is charged with the electric energy induced from the solar energy.

A display module 113a and a light emitting module 113b may be disposed between the front case 111 and the rear case 112 of the first body 110. The display module 113a and the light emitting module 113b are coupled to each other, thereby configuring a display 113.

Examples of the display module 113a may include a liquid crystal display (LCD) module, an organic light emitting diodes (OLED) module, and the like, which can output visible information.

The light emitting module 113b emits light to the display module 113a to illuminate the display module 113a. In this embodiment, the light emitting module 113b is mounted onto a rear surface of the display module 113a so as to emit light from a rear side of the display module 113a to a front side thereof. Alternatively, the light emitting module 113b may be positioned at a side surface of the display module 113a so as to emit light from the side surface of the display module 113a.

Figure 5:
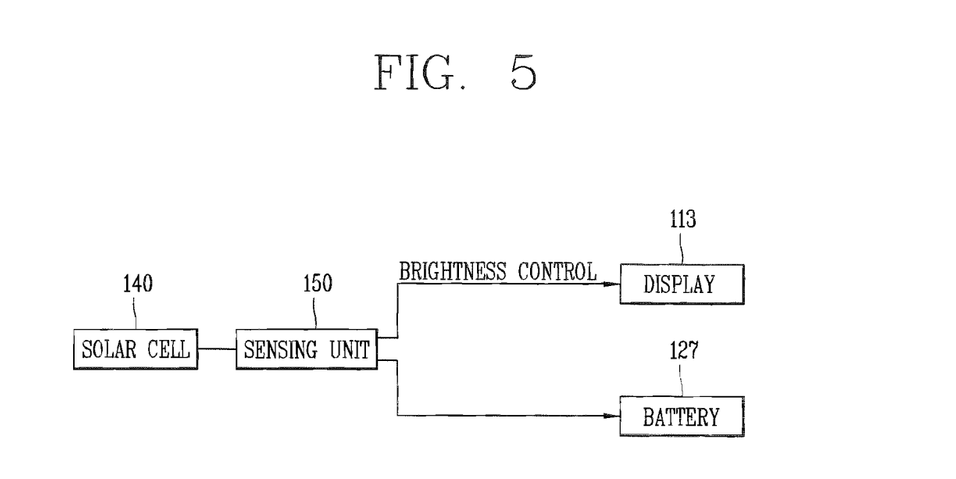
FIG. 5 is an overview showing a method for controlling a display according to the present invention.

FIG. 5 is an overview showing a method for controlling a display according to the present invention.

The portable terminal according to the present invention may include a sensing unit 150 for detecting a quantity of state relating to the electric energy created by the solar cell 140. The sensing unit 150 is electrically connected to both the solar cell 140 and the battery 127. That is, the sensing unit 150 is disposed on a line for connecting the solar cell 140 to the battery 127.

The brightness of the display 113 may be controlled based upon the quantity of state detected by the sensing unit 150. In detail, an amount of light emitted from the light emitting module 113b may be controlled according to the detected result of the sensing unit 150.

According to this embodiment of the present invention, the quantity of state relating to the electric energy may correspond to a current capacity generated from the solar cell 140, and the sensing unit 150 may be implemented as a current monitor, which monitors the current capacity generated from the solar cell 140. Accordingly, the brightness of the display 113 can be controlled according to the current capacity detected by the sensing unit 150.

The solar cell 140 generates electric energy in proportion to an ambient brightness of the portable terminal. Accordingly, the current capacity detected by the sensing unit 150 is in proportion to the ambient brightness of the portable terminal. That is, when the ambient brightness of the portable terminal increases, the current capacity detected by the sensing unit 150 increases. On the other hand, the decrease in the ambient brightness of the portable terminal derives the decrease in the current capacity detected by the sensing unit 150.

As such, the configuration including the solar cell 140 and the sensing unit 150 may function as an illumination sensor for detecting the ambient brightness of the portable terminal.

The brightness of the display 113 may be adjusted in proportion to the current capacity generated from the solar cell 140. Accordingly, the display 113 may be controlled to have brightness proportional to a peripheral illumination of the portable terminal.

In detail, if the periphery of the portable terminal becomes brighter (e.g., if the portable terminal is used outside in the daytime), the brightness of the display 113 increases in correspondence with such environment, resulting in improvement of visibility of the display 113 even at a bright place. Further, if the periphery of the portable terminal becomes darker, the brightness of the display 113 decreases accordingly, thereby decreasing the current capacity consumed to illuminate the display 113.

Here, the display 113 is set to have brightness higher than a predetermined level, which allows a user to view information output on the display 113 even at a dark place without light.

So far, description was given based upon the use of a variation of a current capacity generated from the solar cell 140, as the method for controlling the brightness of the display 113; however, it may also be possible to use the variation of a voltage generated from the solar cell 140.

Figure 6:
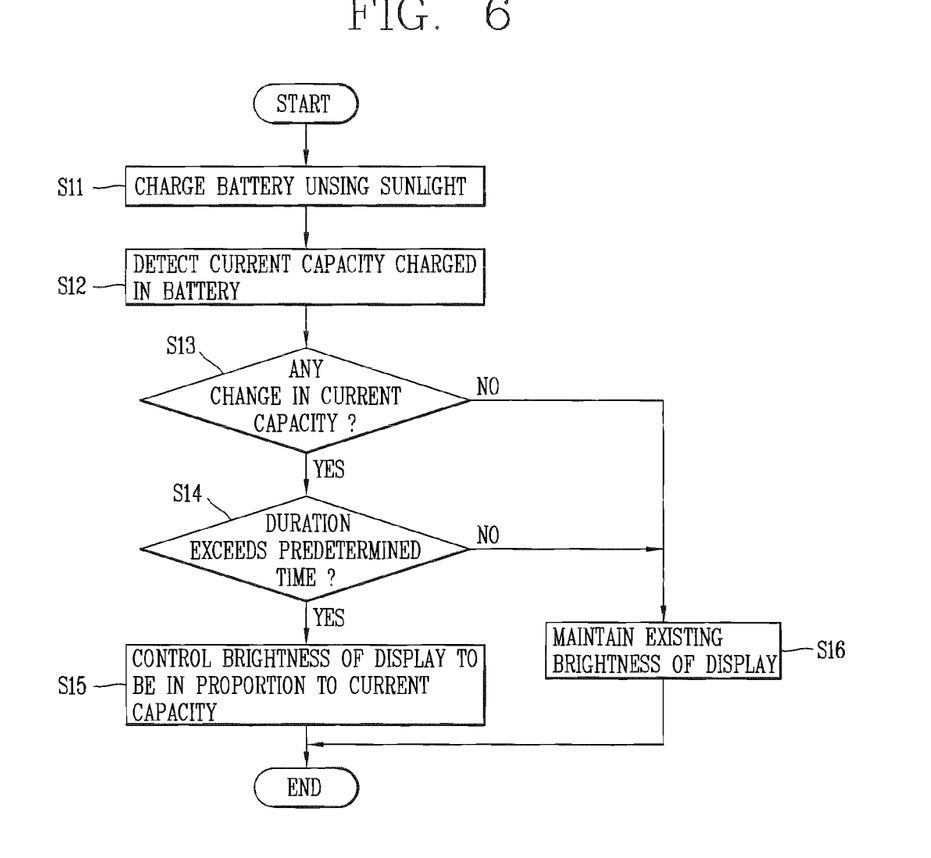
FIG. 6 is a flowchart showing the method for controlling brightness of the display according to the present invention.

FIG. 6 is a flowchart showing a method for controlling brightness of the display according to the present invention. The method for controlling brightness of the display according to the present invention will now be described with reference to FIG. 6.

First, the solar cell 140 is used to convert solar radiation energy into electric energy, and the battery 127 is then charged with the electric energy (S11).

A quantity of state (e.g., a current capacity) relating to the electric energy charged from the solar cell 140 to the battery 127 is detected (S12), which is performed by the sensing unit 150 (e.g., a current monitor).

Then, it is determined whether any change has occurred in the current capacity detected (S13). For instance, if a second current capacity detected at a second peripheral environment increases more than a first current capacity detected at a first peripheral environment, it can be seen that the illumination (illuminance) increases more at the second peripheral environment than at the first peripheral environment. Further, if the second current capacity decreases more than the first current capacity, it can be seen that the illumination decreases more at the second peripheral environment than at the first peripheral environment.

On the basis of such change in the current capacity, the brightness of the display 113 is controlled to be proportional to the detected current capacity (S15). If there is no change in the detected current capacity, the brightness of the display 113 is maintained as it is (S16).

Here, even when a value of the changed current capacity (i.e., second current capacity) is smaller than a specific value (i.e., when a peripheral illumination of the portable terminal is lower than a predetermined level), the display 113 may be set to minimally maintain a brightness higher than a reference level. Accordingly, even when the less current capacity is generated from the solar cell 140 due to the ambient brightness of the terminal being darker (or even when there is no current capacity detected), the brightness of the display 113 can be maintained to be higher than the reference level.

If the current capacity changes from a first current capacity into a second current capacity, the method may further include measuring a duration for which the second current capacity is maintained (S14). The measurement of such duration may be performed by the sensing unit 150 (e.g., the current monitor).

When the duration of the second current capacity being maintained exceeds a predetermined time, the display 113 may be controlled to have brightness in proportion to the current capacity detected (15), and if the duration of the second current capacity being maintained is shorter than the predetermined time, the display 113 maintains its existing brightness (S16).

That is, even when the changed state of current capacity is maintained for a duration shorter than a preset duration and then returns to an original state, no change occurs in the brightness of the display 113. Accordingly, when an amount of light adsorbed into the solar cell 140 changes for a short period of time and then returns to an original state, it is possible to prevent the change in the brightness of the display, undesired by a user. Such undesired cases may include a case of a user temporarily blinding the solar cell 140 with his hand, a case of a user passing through a short tunnel during use of the portable terminal, and the like.

Figure 7:
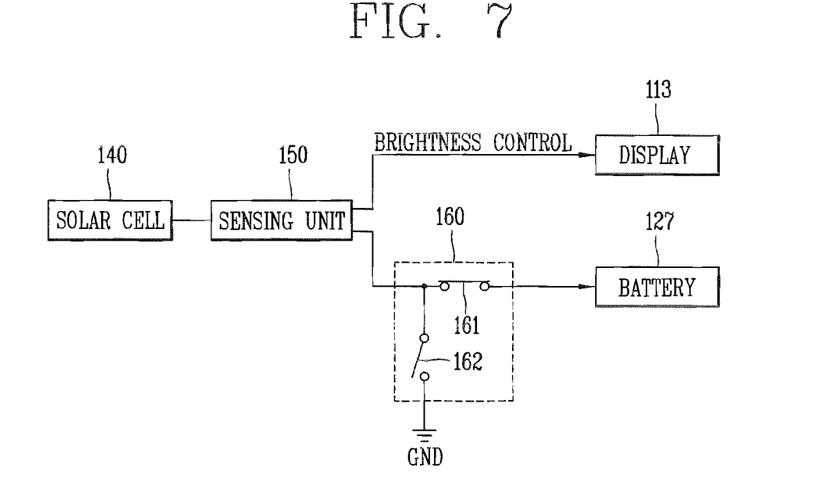
FIG. 7 is a block diagram showing a method for controlling a display in accordance with another embodiment of the present invention.

FIG. 7 is a block diagram showing a method for controlling a display in accordance with another embodiment of the present invention.

A method for controlling the display in accordance with this embodiment may further include dissipating a current transferred to the battery 127 onto a ground GND upon the battery 127 being fully charged. The method for controlling the display according to this embodiment is implemented in the same manner as in the aforesaid embodiment excluding the above added step, so the description of the same configuration will not be repeated.

According to this embodiment, a switching unit 160 may be disposed between the sensing unit 150 and the battery 127. The switching portion 160 serves to dissipate a current generated from the solar cell 140 to the ground GND upon the battery being fully charged.

The switching unit 160 may include a first switch 161 for opening or closing a line which connects the solar cell 140 to the battery 127, and a second switch 162 for opening or closing a line which connects the solar cell 140 to the ground GND.

While the charging of the battery 127 is in progress, it may be set such that the first switch 161 is switched on and the second switch 162 is switched off. In this case, the current generated from the solar cell 140 may flow toward the battery 127.

When the battery 127 is fully charged, it may be set such that the first switch 161 is switched off and the second switch 162 is switched on. In this case, the current generated from the solar cell 140 may not flow to the battery 127, ended up with being dissipated to the ground GND.

With such configuration, the sensing unit 150 can accurately detect a current capacity generated from the solar cell 140 regardless of any of the cases, namely, whether the battery 127 is being charged and whether the battery 127 is completely charged. Hence, the sensing unit 150 can accurately detect an ambient brightness of the portable terminal even when the battery 127 is completely charged.

Figure 8:
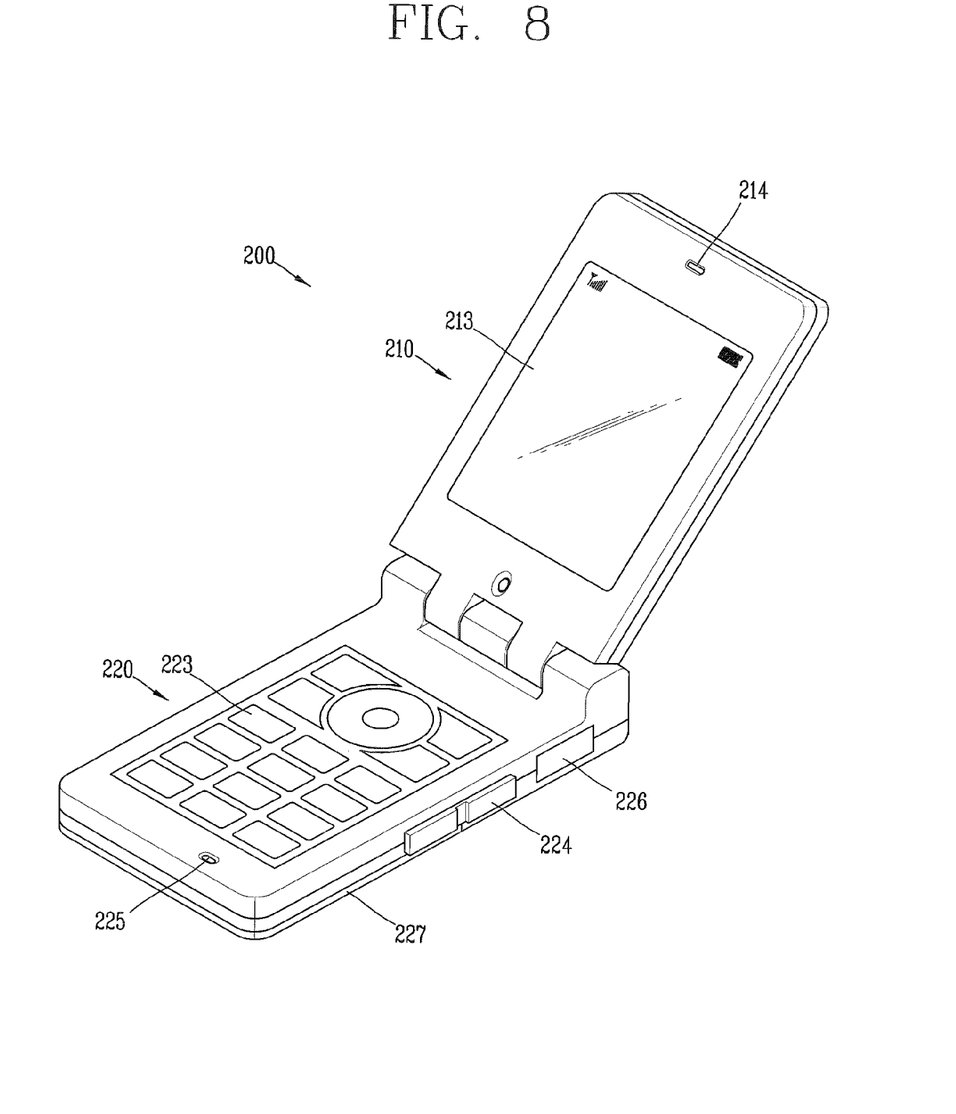
FIGS. 8 and 9 are perspective views each showing a portable terminal in accordance with another embodiment of the present invention.
Figure 9:
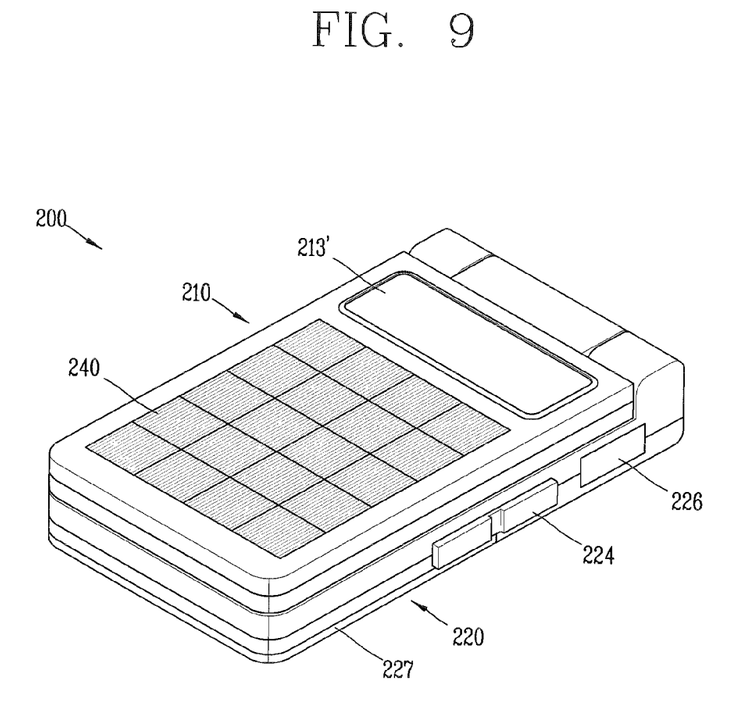

FIGS. 8 and 9 are perspective views each showing a portable terminal in accordance with another embodiment of the present invention, each of which exemplarily shows a folder type portable terminal.

A portable terminal in accordance with this embodiment may include a first body 210 and a second body 220 connected to the first body 210 to be rotatable from the first body 210. The first and second bodies 210 and 220 may be relatively rotated to an unfolded state of FIG. 8 and to a folded state of FIG. 9.

A display 213, an audio output unit 214 and the like may be disposed at one surface (e.g., a front surface) of the first body 210, and a sub display 213' and a solar cell 240 may be disposed at another surface (e.g., a rear surface) of the first body 210.

The second body 220 may be provided with a manipulation unit 223, an audio input unit 225, an interface unit 226, a power supply 227 and the like.

The portable terminal operates in a standby mode in the folded state as shown in FIG. 9. In this standby mode, the solar cell 240 adsorbs sunlight so as to charge a battery 227. In general, if the folder type portable terminal is placed on a table or a ground, the portable terminal is placed with the rear surface of the first body 210 facing upward. In this case, the solar cell 240 also faces upward, which conveniences a user such that he does not have to change the posture of the portable terminal.

As aforementioned, the embodiments exemplarily illustrated the solar cell applied to the slide type portable terminal and the folder type portable terminal; however, the solar cell may be applicable to a bar type portable terminal. In this case, it may be preferable that a display is disposed on a front surface of the terminal body and a solar cell is disposed on a rear surface of the terminal body. Otherwise, the solar cell may be applicable to various types of portable terminals, including a swing type, a swivel type and the like.

Meanwhile, the method for controlling the brightness of the display using the solar cell was described; however, such method can be applicable same to a method for illuminating (radiating) the keypad 123. For instance, a method may be applied such that if an ambient brightness of the terminal is stronger than a particular brightness, a light emitting unit of the keypad 123 is turned on, and if it is weaker than the particular brightness, the light emitting unit of the keypad 123 is turned off.

Figure 10:
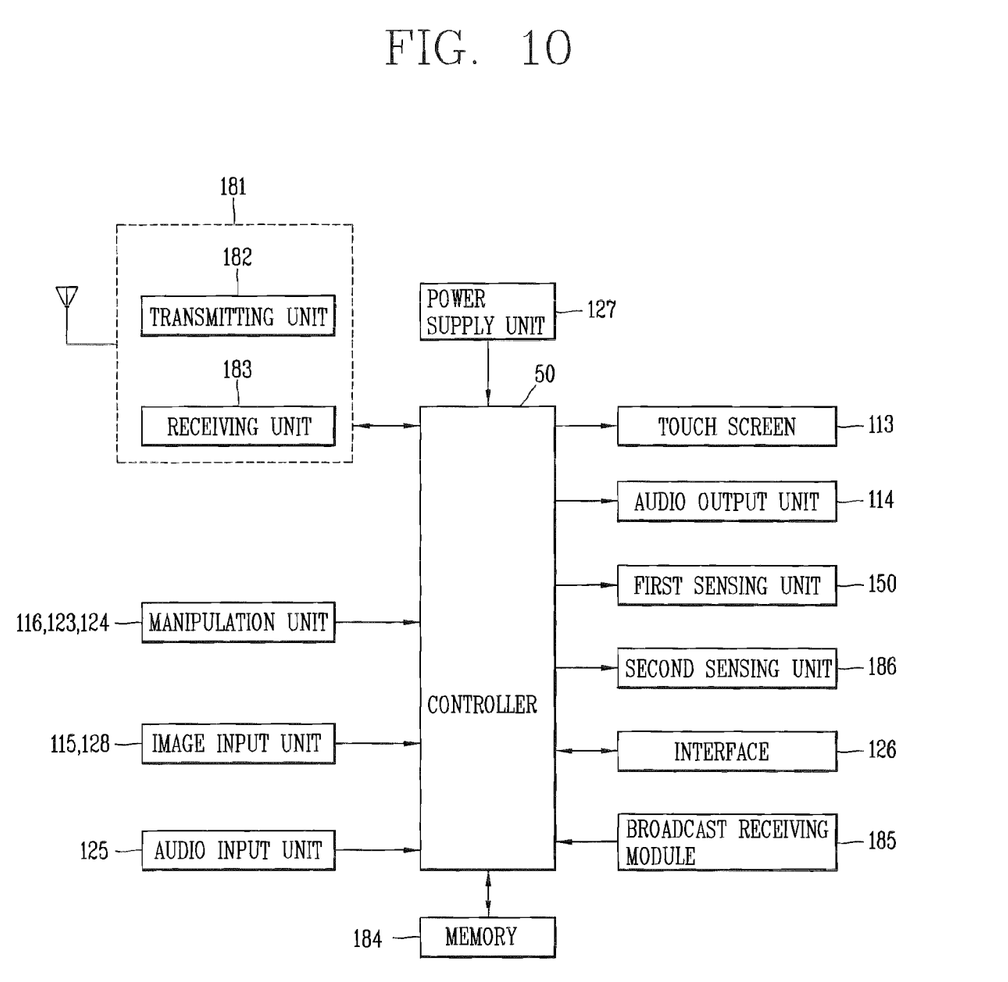
FIG. 10 is a block diagram of a portable terminal in accordance with one embodiment of the present invention.

FIG. 10 is a block diagram of a portable terminal in accordance with one embodiment of the present invention.

As shown in FIG. 10, the portable terminal according to one embodiment of the present invention may include a wireless communication module 181, manipulation units 116, 123 and 124, image input units 115 and 128, an audio input unit 125, a display 113, audio output units 114 and 131, first and second sensing units 150 and 186, an interface 126, a broadcast receiving module 185, a memory 184, a power supply 127 and a controller 180.

The controller 180 may control the overall operations of the portable terminal. For example, the controller 180 may perform related control and processing for a voice call communication, data communication, telephony communication and the like.

Further, the controller 180 may control brightness of the display 113 based upon electric energy detected by the sensing unit 150 (hereinafter, referred to as 'first sensing unit') according to the present invention. As stated above, the controller 180 may control brightness of the display 113, namely, an amount of light emitted from the light emitting module 131b in proportion to a current capacity generated from the solar cell 140.

Further, the controller 180 may control such that the brightness of the display 113 can be changed only when a duration of a changed current capacity being maintained is longer than a particular time, and the brightness of the display 113 can be maintained to be higher than a reference level even when a peripheral illumination of the terminal is lower than a particular level.

The wireless communication module 181 may transmit and receive wireless signals with a mobile communication base station via an antenna. For example, the wireless communication module 181 manages transmission and reception of audio data, text data, video data and control data under the control of the controller 180. To this end, the wireless communication module 181 may include a transmitting unit 182 for modulating and transmitting a signal to be sent, and a receiving unit 183 for demodulating a signal received.

The manipulation units 116, 123 and 124 may provide key input data inputted by a user for controlling the operation of the terminal to the controller 180. The manipulation units 116, 123 and 124 may be implemented as a dome switch, a touchpad (e.g., static pressure/capacitance), a jog wheel, a jog switch and the like.

The image input units 115 and 128 process image frames of still images or video obtained by an image sensor in a video call mode or a capturing mode. Such processed image frames are converted into image data displayable on the display 113 to be then outputted on the display 113.

The image frames processed by the image input units 115 and 128 may be stored in the memory 184 by the control of the controller 180 or be sent to the exterior via the wireless communication module 181.

The audio input unit 125 receives an external audio signal via a microphone while the portable terminal is in a particular mode, such as phone call mode, recording mode and voice recognition. This audio signal is processed and converted into digital data. Such processed digital data is converted into a data format transmittable to a mobile communication base station via the wireless communication module 181 when the portable terminal is in the phone call mode, and then outputted to the wireless communication module 181. The processed digital data may be stored in the memory 184 in a recording mode.

The audio input unit 125 may include assorted noise removing algorithms to remove noise generated in the course of receiving the external audio signal.

The display 113 displays information processed in the portable terminal. For example, when the portable terminal is in a phone call mode, the display 113 displays User Interface (UI) or (Graphic User Interface (GUI) related to the call under the control of the controller 180. When the portable terminal is in the video call mode or a capturing mode, the display 113 displays images captured or UI or GUI under the control of the controller 180. The display 113 may be configured with including a touch screen. Such configuration permits the display 113 to function both as an output device and an input device.

The audio output units 114 and 131 may convert audio data received from the wireless communication module 181 or audio data stored in the memory 184 under the control of the controller 180 when the portable terminal is in the call-receiving mode, a phone call mode, a recording mode, a voice recognition mode, or a broadcast receiving mode. Such converted audio data is then outputted to the exterior.

Further, the audio output units 114 and 131 also output an audio signal associated with a function (e.g., outputting a call receiving sound, a message receiving sound, or the like) performed in the portable terminal.

The first sensing unit 150 may detect a quantity of state relating to electric energy generated from the solar cell 140 and transfers the detected quantity of state to the controller 180. The first sensing unit 150 may be implemented in various forms, such as an ammeter for measuring a current, a voltmeter for measuring a voltage and the like.

The second sensing unit 186 provides status measurements of various aspects of the portable terminal. For instance, the sensing unit 186 may detect an open/close status of the portable terminal, a change of position of the portable terminal or a component of the portable terminal, a presence or absence of user contact with the portable terminal and the like, thereby generating a sensing signal for controlling the operation of the portable terminal. For example, the sensing unit 186 senses the open or closed state of the portable terminal, and output the sensed result to the controller 180, such that the operation of the portable terminal can be controlled. Other examples include the sensing unit 186 sensing the presence or absence of power provided by the power supply 127, the presence or absence of a coupling or other connection between the interface 126 and an external device.

The interface 126 is often implemented to couple the portable terminal with external devices. Typical external devices include wired/wireless headphones, external chargers, wired/wireless data ports, card sockets (e.g., memory card, SIM/UIM card or the like) and the like. The interface 124 may allow the portable terminal to receive data or power from external devices and transfer such data or power to each component inside the portable terminal, or transmit internal data of the portable terminal to external devices.

The memory 184 may store a program for the control and processing of the controller 180, or temporarily store input/output data (e.g., phone book data, messages, still images, video or the like).

The memory 184 may store a program for controlling the operation of the portable terminal according to the present invention.

The memory 184 may include typically known hard disk, a card-type memory (e.g., SD or XD memory), a flash memory, RAM, ROM and the like.

The broadcast receiving module 185 may receive broadcast signals transmitted via satellites or terrestrial waves and convert such broadcasting signal into a broadcast data format displayable onto the audio output units 114 and 131 and the display 113 so as to output to the controller 180. The broadcast receiving module 185 may also receive additional data associated with broadcasting (e.g., Electric Program Guide (EPG), channel list, or the like). The broadcast data converted in the broadcast receiving module 185 and the additional data may be stored in the memory 184.

The power supply 127 provides power required by the various components for the portable terminal under the control of the controller 180. The provided power may be internal power, external power, or combinations thereof.

As described above, the present invention permits a detection of an ambient brightness of the portable terminal by detecting a current capacity generated from the solar cell, whereby the detected ambient brightness can be used to adjust brightness of the display. Hence, a single component can simultaneously serve to charge a battery and detect brightness.

Further, the present invention is configured such that the brightness of the display increases at a bright place so as to improve visibility of the display while the brightness of the display decreases at a dark place so as to reduce power consumed to illuminate the display.

The aforesaid portable terminal and method for controlling the display is not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal comprising:
   a terminal body including a printed circuit board and a display;
   a battery compartment formed in the terminal body, wherein the battery compartment is sized to receive a battery, the battery compartment including an aperture configured to expose a terminal portion of the battery to an interior of the terminal body;
   a compartment cover being configured to removably couple to the terminal body at the battery compartment, wherein in a coupled state the compartment cover conceals the battery compartment regardless of whether or not the battery is in the battery compartment and in a decoupled state the compartment cover exposes the battery compartment to an outside of the terminal, the compartment cover including a recessed portion extending into the compartment cover from a rear surface of the compartment cover;
   a solar cell affixed to an outer side of the compartment cover, wherein the solar cell is configured to convert light into electric energy for charging the battery;
   a first connection terminal located coupled to the recessed portion of the compartment cover such that the entirety of the first connection terminal is within the recessed portion of the compartment cover, the first connection terminal electrically connected to the solar cell;
   a first element coupled to the circuit board at a location that is adjacent to the aperture and adjacent to the recessed portion when the compartment cover is in the coupled state;
   a second connection terminal protruding from the first element in a first direction such that the second connection terminal extends into the recessed portion of the compartment cover to electrically couple to the first connection terminal when the compartment cover is in the coupled state, and the second connection terminal is electrically disconnected from the first connection terminal when the compartment cover is in the decoupled state;
   a third connection terminal that protrudes from the first element in a second direction and extends into the aperture to contact a contact of a battery in the battery compartment, wherein the first direction and the second direction are substantially orthogonal;
   a sensing unit electrically connected to the solar cell and configured to detect a quantity of electric energy generated by the solar cell;
   a switching unit including a first switch and a second switch, the first and second switches electrically connected in parallel to the sensing unit, the first switch further electrically connected to the third connection terminal, and the second switch further electrically connected to ground, wherein the switching unit is configured to close the first switch and open the second switch while a battery in the battery compartment is not fully charged during a charging operation such that the electric energy generated by the solar cell is provided to the battery through the first switch, and to open the first switch and close the second switch while a battery in the battery compartment is fully charged during the charging operation such that the electric energy generated by the solar cell is provided to ground; and
   a controller that is electrically connected to the second connection terminal, the controller configured to control battery charging in the battery compartment, and further configured to control a brightness of the display based upon the quantity of the detected electric energy of the solar cell.

2. The portable terminal of claim 1, wherein the sensing unit comprises a current monitor configured to detect a current generated by the solar cell.

3. The portable terminal of claim 2, wherein the controller is further configured to control the display to have a brightness that is proportional to the detected current such that the brightness of the display is proportional to a peripheral illumination of the display.

4. The portable terminal of claim 2, wherein:
the current monitor is further configured to determine a duration for which a change in the detected current is maintained; and
the controller is further configured to control the display to have a brightness that corresponds to the changed detected current when the determined duration exceeds a predetermined duration of time.

5. The portable terminal of claim 1, wherein the controller is further configured to control the display to maintain a brightness that is higher than a reference level when a peripheral illumination of the terminal body is lower than a predetermined level.

6. The portable terminal of claim 1, wherein the display comprises:
a display module configured to output visible information; and
a light-emitting module configured to emit light to the display module in order to illuminate the display module,
wherein the controller is further configured to control an amount of light emitted from the light-emitting module according to the detected quantity of electric energy.

7. The portable terminal of claim 1, wherein:
the display is located on the front surface of the terminal body; and
the solar cell is located on the rear surface of the terminal body.

8. The portable terminal of claim 1, wherein:
the terminal body further comprises a first body and a second body that are rotatably coupled to each other;
the display is located on one surface of either the first body or the second body; and
the solar cell is located on another surface of either the first body or the second body.

* * * * *